US006249738B1

United States Patent
Higashimata et al.

(10) Patent No.: US 6,249,738 B1
(45) Date of Patent: Jun. 19, 2001

(54) APPARATUS AND METHOD FOR AUTOMATICALLY CONTROLLING VEHICULAR VELOCITY

(75) Inventors: Akira Higashimata; Hideo Iwamoto; Takenori Hashizume, all of Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/320,575

(22) Filed: May 27, 1999

(30) Foreign Application Priority Data

May 27, 1998 (JP) .................................................. 10-146048

(51) Int. Cl.$^7$ .................................................. B60K 31/04
(52) U.S. Cl. ........................... 701/96; 701/301; 180/169; 340/904; 340/70
(58) Field of Search ............................. 701/96, 91, 301, 701/300; 180/169; 340/904; 342/70

(56) References Cited

U.S. PATENT DOCUMENTS

| 4,622,636 | * | 11/1986 | Tachibana | ............................. 701/96 |
| 5,215,159 | * | 6/1993 | Nishida | ................................ 180/179 |
| 5,396,426 | * | 3/1995 | Hibino et al. | ........................... 701/96 |
| 5,710,565 | | 1/1998 | Shirai et al. | ............................ 342/70 |

FOREIGN PATENT DOCUMENTS 5-104993   4/1993   (JP) .

* cited by examiner

Primary Examiner—William A. Cuchlinski, Jr.
Assistant Examiner—Arthur D. Donnelly
(74) Attorney, Agent, or Firm—McDermott, Will & Emery (57) ABSTRACT

In apparatus and method for controlling a vehicular velocity for an automotive vehicle, when a controller carries out a preceding vehicle follow-up control to follow up a preceding vehicle which is traveling ahead of the vehicle and is decelerated and a vehicular velocity of the vehicle becomes reduced and has crossed a set lower limit value of the vehicular velocity in a vehicular velocity controllable range, the controller releases the preceding vehicle follow-up control but continues a braking operation through a vehicular brake system using a function generator (Pbrk*=f(t)MPa) to prevent a sudden G drop from occurring.

13 Claims, 7 Drawing Sheets

APPARATUS AND METHOD FOR AUTOMATICALLY CONTROLLING VEHICULAR VELOCITY

BACKGROUND OF THE INVENTION a) Field of the Invention

The present invention relates to apparatus and method for controlling a vehicular velocity so as to make the vehicular velocity equal to a target vehicular velocity in order to follow up a preceding vehicle which is traveling ahead of the vehicle at an appropriate inter-vehicle distance.

b) Description of the Related Art

A Japanese Patent Application First Publication No. Heisei 5-104993 published on Apr. 27, 1993 exemplifies a previously proposed preceding vehicle follow-up controlling apparatus for controlling an opening angle of an engine throttle valve for an automotive vehicle and a braking force operatively applied from a vehicular brake system to the vehicle according to a deviation between a safe inter-vehicle distance determined on the basis of a detected value of a vehicular velocity and a relative velocity to a preceding vehicle and a detected value of the inter-vehicle distance.

In such a kind of apparatus described above, a range of a vehicular velocity of the vehicle to be enabled to follow up the preceding vehicle (so-called, a vehicular velocity controllable range, for example, 40 Km/h to 110 Km/h) is prescribed. Then, the preceding vehicle follow-up control to follow up the preceding vehicle at a time point when the vehicular velocity becomes reduced and has exceeded the prescribed lower limit velocity value is released to be ineffective.

SUMMARY OF THE INVENTION

However, while the preceding vehicle is decelerated so that the vehicle is accordingly decelerated, the brake being applied to the vehicle in the previously proposed preceding vehicle follow-up controlling apparatus, the preceding vehicle follow-up control is released and such a sudden deceleration drop of, so-called, a sudden G (gravational acceleration) drop occurs so that a vehicular occupant(s) of the vehicle receives a jolt and gives an unpleasant feeling.

It is therefore an object of the present invention to provide apparatus and method for performing an automatic control over a vehicular velocity for an automotive vehicle in which a braking control using the vehicular brake system is continued to prevent the sudden deceleration (G) drop from occurring even if a vehicular velocity becomes decreased and has crossed the set lower limit velocity value in the vehicular velocity controllable range while the vehicle is decelerated to follow up the preceding vehicle.

The above-described object can also be achieved by providing a vehicular velocity controlling apparatus for an automotive vehicle, comprising: an inter-vehicle distance detector detecting an inter-vehicle distance from the vehicle to another vehicle which is running ahead of the vehicle; a vehicular velocity detector detecting a vehicular velocity of the vehicle; an inter-vehicle distance controller, the inter-vehicle distance controller calculating a target value of the vehicular velocity, the target value of the vehicular velocity being calculated to make the detected value of the inter-vehicle distance equal to a target value of the inter-vehicle distance; a vehicular velocity servo controller, the vehicular velocity servo controller being responsive to the target value of the vehicular velocity from the inter-vehicle distance controller, calculating a target value of a vehicular force to be exerted by the vehicle to vary the vehicular velocity according to the target value of the vehicular velocity, and distributing the target value of the vehicular force exerted by the vehicle into a vehicular driving force for a vehicular drive system and a vehicular braking force for a vehicular brake system; a comparator, the comparator comparing the detected value of the vehicular velocity with a set lower limit value of the vehicular velocity in a vehicular velocity controllable range; a control release command generator, the control release command generator being responsive to a result of a comparison by the comparator and generating and outputting a release command to release a calculation of the target value of the vehicular velocity by the inter-vehicle distance controller and to release the calculation of the target value of the vehicular force by the vehicular velocity servo controller; and a function generator, the function generator being responsive to the result of the comparison by the comparator and generating and outputting a predetermined function to the vehicular brake system to only continue a control of the vehicular braking force through the vehicular brake system.

The above-described object can be achieved by providing a vehicular velocity controlling method for an automotive vehicle, comprising: detecting an inter-vehicle distance from the vehicle to another vehicle which is running ahead of the vehicle; detecting a vehicular velocity of the vehicle; calculating a target value of the vehicular velocity, the target value of the vehicular velocity being calculated to make the detected value of the inter-vehicle distance equal to a target value of the inter-vehicle distance; calculating a target value of a vehicular force to be exerted by the vehicle to vary the vehicular velocity according to the target value of the vehicular velocity; distributing the target value of the vehicular force exerted by the vehicle into a vehicular driving force for a vehicular drive system and a vehicular braking force for a vehicular brake system; comparing the detected value of the vehicular velocity with a set lower limit value of the vehicular velocity in a vehicular velocity controllable range; outputting a release command to release a calculation of the target value of the vehicular velocity and to release the calculation of the target value of the vehicular force; and outputting a predetermined function to the vehicular brake system to only continue a control of the vehicular braking force through the vehicular brake system.

DETAILED DESCRIPTION OF THE PREFERRED EMBODIMENT

Reference will hereinafter be made to the drawings in order to facilitate a better understanding of the present invention.

Figure 1A:
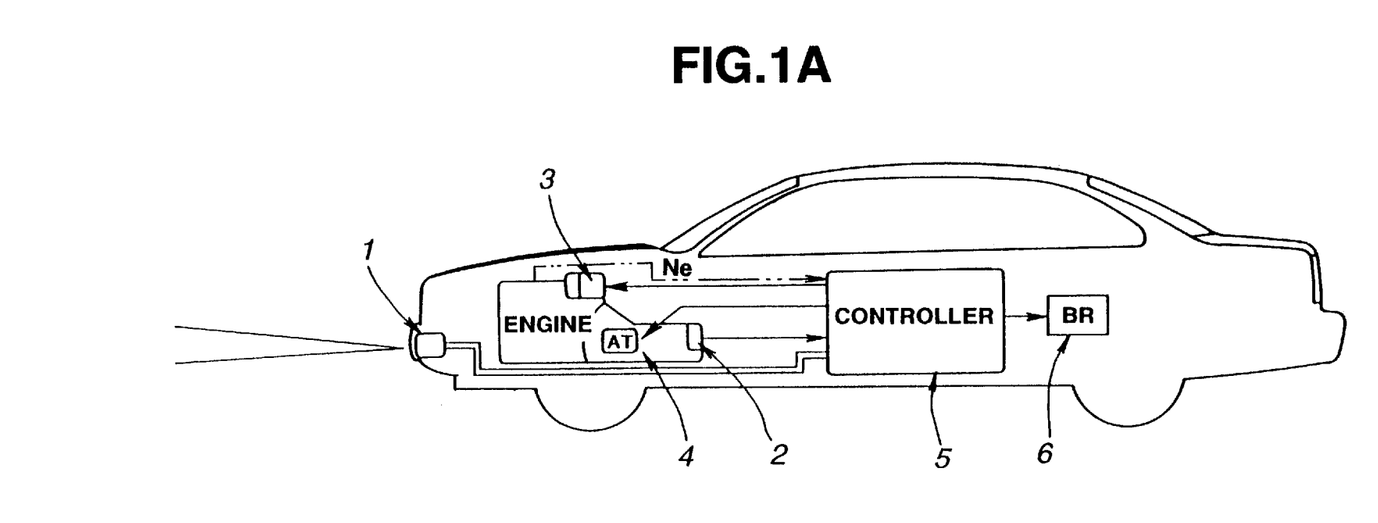
FIG. 1A is an explanatory view of an automotive vehicle to which an apparatus for performing an automatic control over a vehicular velocity in a preferred embodiment according to the present invention is applicable.

FIG. 1A shows an explanatory view of an automotive vehicle to which an apparatus for controlling a vehicular velocity in a preferred embodiment according to the present invention is applicable.

In FIG. 1A, an inter-vehicle distance sensor (head) 1 is a sensor head of a radar type such that a laser beam is scanned over a given scanning angle in a width-wise direction of the vehicle and the reflected beams are received from an object (s) present in, generally, a forward detection zone defined by the scanning angle to detect the object(s), e.g., a preceding vehicle. It is noted that an electromagnetic wave or ultrasonic wave may be used in place of the laser beam. The inter-vehicle distance sensor 1 is exemplified by a U.S. Pat. No. 5,710,565 (issued on Jan. 24, 1998)(, the disclosure of which is herein incorporated by reference).

A vehicle velocity sensor 2, attached on an output shaft of an automatic transmission 4, outputs a pulse train signal whose period is in accordance with a revolution velocity of the output shaft of the automatic transmission 4.

A throttle valve position actuator 3 (constituted, for example, by a DC motor) actuates a throttle valve of an engine associated with the automatic transmission 4 to be opened or closed in response to a throttle valve opening angle command signal so as to vary an intake air quantity to be supplied to the engine to adjust an engine output torque.

The automatic transmission (A/T) 4 varies a gear ratio thereof in accordance with the vehicle velocity and the engine output torque described above.

A brake system 6 serves to develop a braking force to be applied to the vehicle shown in FIG. 1A.

Figure 1B:
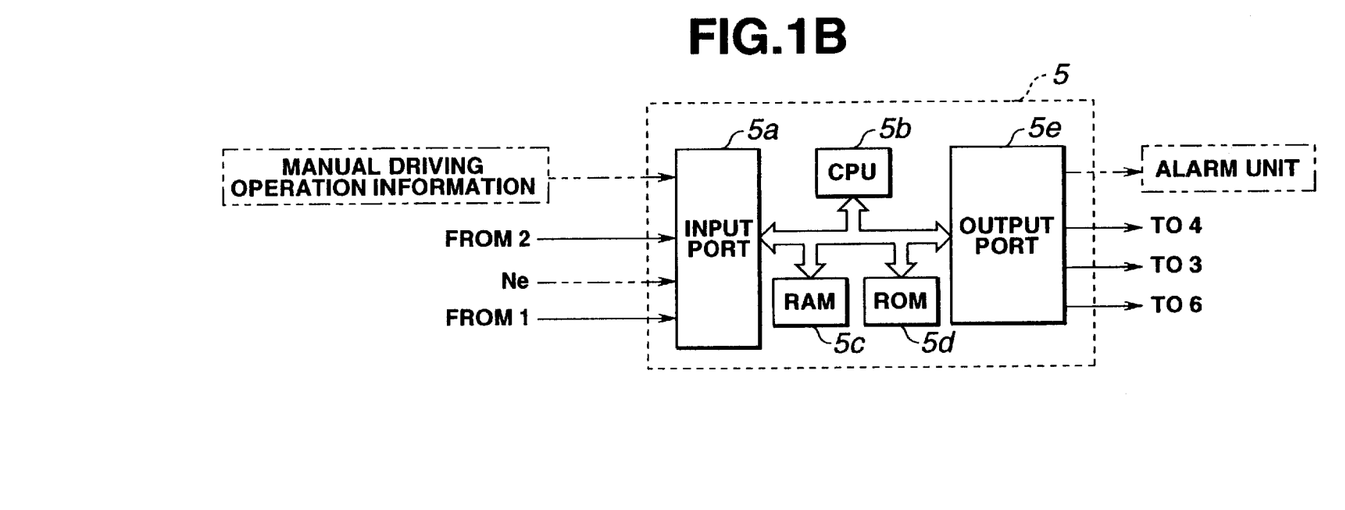
FIG. 1B is a circuit block diagram of a controller in the apparatus shown in FIG. 1A.

An inter-vehicle distance controller 5 includes a microcomputer and its peripheral parts, as shown in FIG. 1B.

The microcomputer of the controller 5 includes a CPU (Central Processing Unit) 5b, a RAM (Random Access Memory) 5c, a ROM (Read Only Memory) 5d, an Input Port 5a, an Output Port 5e, and a common bus, as shown in FIG. 1B.

The inter-vehicle distance controller 5 calculates a target vehicular velocity on the basis of a detected value of the inter-vehicle distance and a detected value of the vehicular velocity and controls operations of the throttle valve position actuator 3, of the automatic transmission 4, and of the brake system 6. The inter-vehicle distance controller 5 constitutes control blocks 11, 21, 50, and 51 shown in FIG. 2 in terms of software. The details of the function of the inter-vehicle distance controller 5 will be described later.

Figure 2:
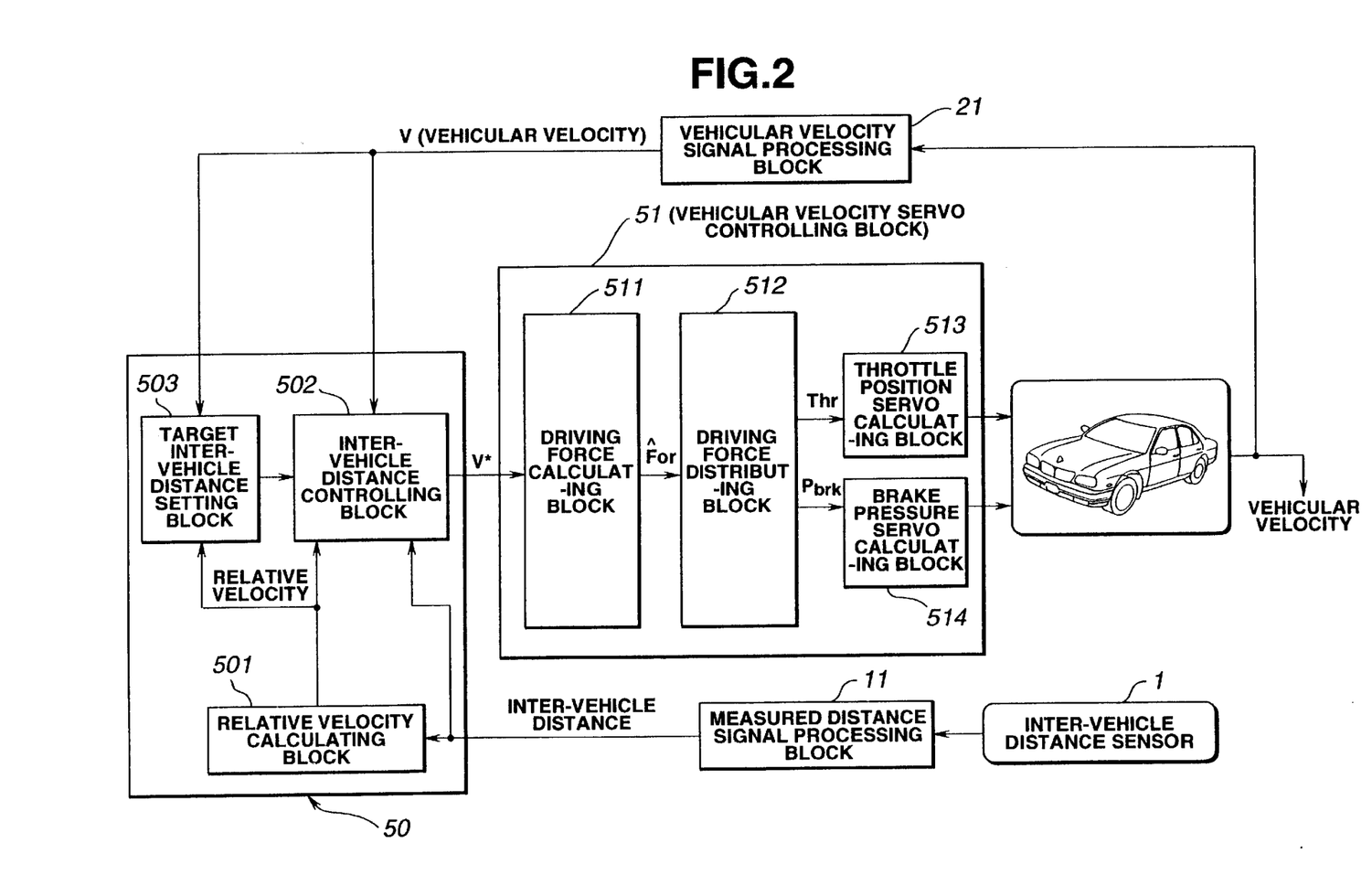
FIG. 2 is a functional block diagram of the controller in the apparatus shown in FIG. 1A.

FIG. 2 shows the functional block diagram of the inter-vehicle distance controller 5 in the preferred embodiment according to the present invention.

In FIG. 2, a measured distance signal processing block 11 measures a time duration from a time at which the laser beam is radiated to scan the detection range from the inter-vehicle distance sensor 1 to a time at which the reflected laser beam is reached to the head 1 to calculate the inter-vehicle (spatial) distance $L_T$ from the vehicle in which the apparatus shown in FIG. 1A is installed to another vehicle (so-called, a preceding vehicle) which is traveling ahead of the vehicle.

It is noted that if a plurality of such preceding vehicles as described above are trapped by the inter-vehicle distance sensor 1, one of the preceding vehicles to be followed is specified and its inter-vehicle distance to be the specified preceding vehicle is calculated.

Since a method of selecting the specified one of the preceding vehicles is well known, the detailed description thereof will herein be omitted. It is noted that the selection method is exemplified by the U.S. Pat. No. 5,710,565 issued on Jan. 20, 1998(,the disclosure of which is herein incorporated by reference).

A vehicular velocity signal processing block 21 measures a period of the vehicular velocity pulses from the vehicular velocity sensor 2 to derive the vehicular velocity.

In addition, a preceding vehicle follow-up controlling block 50 includes: a relative velocity calculating block 501; a target inter-vehicle distance setting block 503; and an inter-vehicle distance controlling block 502.

The preceding vehicle follow-up controlling block 50 calculates a target inter-vehicle distance $L_T{}^*$ and a target vehicular velocity $V^*$ on the basis of the detected values $L_T$ and V of the inter-vehicle distance and of the vehicular velocity.

The relative velocity calculating block 501 calculates a relative velocity between the vehicle and the preceding vehicle on the basis of the detected value of the inter-vehicle distance by the measured distance signal processing block 11.

The inter-vehicle distance controlling block 502 calculates the target vehicular velocity $V^*$ to make the inter-vehicle distance equal to the target inter-vehicle distance $L_T{}^*$ with the relative velocity $\Delta V$ in mind.

The target inter-vehicle distance setting block 503 sets the target inter-vehicle distance $L_T{}^*$ which is in accordance with the vehicular velocity $V_T$ of the preceding vehicle or the vehicular velocity Vs (or V) of the vehicle itself.

Furthermore, a vehicular velocity servo controlling block 51 controls a throttle valve angular position (or called, throttle position) of the engine throttle valve through the throttle position actuator 3, the gear ratio of the automatic transmission 4, and/or the braking force of the braking system 6.

Hence, the inter-vehicle distance controller 5 controls the vehicular velocity so that the vehicle can run at a safe velocity even during a run of a curved road.

In details, the vehicular servo controlling block 51 includes: a driving force calculating block 511; a driving force distributing block 512; a throttle position servo calculating block 513; and a brake pressure servo calculating block 514.

The vehicular velocity servo controlling block 51 controls the throttle valve angular position Thr (opening angle) through the throttle actuator 3 and the braking liquid pressure Pbrk of the brake system 6 so that the vehicular velocity V is adjusted to be made coincident with the target vehicular velocity $V^*$.

The driving force calculating block 511 calculates a target driving/braking force For0̂ to make the vehicular velocity V coincident with the target vehicular velocity $V^*$.

The driving force distributing block 512 distributes the target driving force For0̂ into a target driving force Thr with respect to the throttle position servo calculating block 513 and into a target braking force Pbrk with respect to the brake pressure servo calculation block 514.

The throttle position servo calculating block 513 regulates the throttle actuator 3 in accordance with the target driving/braking force Forô and regulates the brake system 6 in accordance with the target braking force. The target driving/braking force means the target value of a vehicular force to be exerted by the vehicle.

Next, an inter-vehicle distance control system will be described below with reference to FIG. 3.

The system of the automatic vehicular velocity controlling apparatus in the preferred embodiment shown in FIG. 1A is, so-called, a one-input-and-two-output system controlling two target values of the inter-vehicle distance $L_T$ and the relative velocity $\Delta V$ through a single input(the target vehicular velocity).

Hence, the control system is designed using a state feedback (regulator).

State variables $x_1$ and $x_2$ of the control system are defined in the following equations:

$$x_1 = V_T - V \quad (1)$$

$$x_2 = L_T^* - L_T \quad (2)$$

In the equations of (1) and (2), $V_T$ denotes the vehicular velocity of the trapped preceding vehicle.

In addition, a control input, i.e., an output of the inter-vehicle distance controller 5 is denoted by $\Delta V^*$ which is defined in the following equation:

$$\Delta V^* = V_T - V^* \quad (3)$$

The inter-vehicle distance $L_T$ is given as follows:

$$L_T = \int (V_T - V) dt + L_0 \quad (4).$$

In the equation (4), $L_0$ denotes an initial value of the inter-vehicle distance $L_T$.

The vehicular velocity servo system can be approximately expressed in such a manner that the actual vehicular velocity V (=Vs) with respect to the target vehicular velocity V* provides a first order lag as given by the equation (5) of TABLE 1.

In the equation (5), S denotes a Laplace transform operator and τv denotes a time constant.

Suppose that the vehicular velocity of the preceding vehicle $V_T$ indicates constant.

An equation (6) of TABLE 2 can, in this supposition, be obtained according to numerical equations (1), (2), and (3).

Furthermore, the state equation of the system can be described in an equation (7) of TABLE 3.

In the equation (7) of TABLE 3, Vs indicates V. Hence, the state equation of the system can be described in an equation of (8) in TABLE 4.

The control input u to perform a state feedback is given by each of equations (9) in TABLE 5.

The state equation of the whole system in which the state feedback is carried out can be represented in an equation (10) of TABLE 5.

If an equation of (11) in TABLE 5 is established, a characteristic equation can be derived as follows:

On the basis of a transfer characteristic of the vehicular velocity servo system described above, gains fd and fv are set so that characteristics to converge the inter-vehicle distance $L_T$ into the target inter-vehicle distance $L_T^*$ and to converge the relative velocity $\Delta V$ into zero give desired characteristics as expressed in equations (12) and (13) of TABLE 5 and (14) and (15) of TABLE 6.

Hence, the target vehicular velocity V* to execute the inter-vehicle distance control is derived as given in equations (16) and (17) of TABLE 7 in accordance with the numerical equations (3) and (9).

Figure 3:
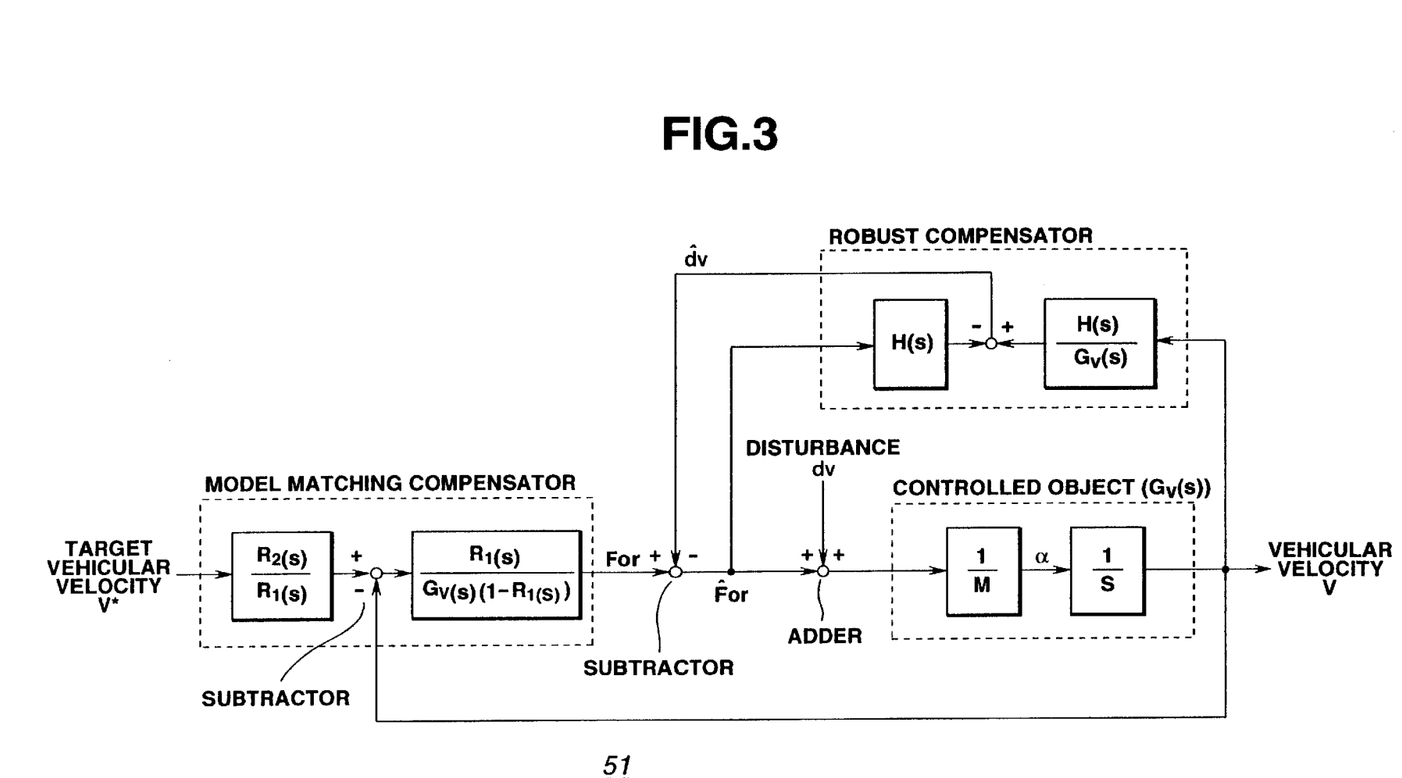
FIG. 3 is a detailed functional block diagram of a vehicular velocity servo controlling block of the controller shown in FIG. 2.

FIG. 3 shows a control block diagram of the vehicular velocity servo controlling block 51 shown in FIG. 2.

The vehicular velocity servo controlling block 51 is designed using a robust model matching control technique, the vehicular velocity servo controlling block 51 shown in FIG. 2A.

The vehicular velocity servo controlling block 51 is designed using a robust model matching control technique, the vehicular velocity servo controlling block 51 being constituted by, e.g., a robust compensator which serves as a disturbance estimator and a model matching compensator which makes the whole response characteristic of the vehicular velocity servo controlling block 50 substantially equal to a response characteristic of a normal (standard) model, in order for the vehicular velocity controlling block 51 to provide a robust control system to such a variation in a road surface gradient. The robust compensator estimates and compensates for such external disturbance as a modeling error of a controlled object (viz. the vehicle) and a running resistance of the controlled object so that the vehicular velocity servo controlling block 51 can be constituted by a control system in which an actual characteristic is made coincident with a linear model Gv(s).

In FIG. 3, H(S) denotes a robust filter determining an external disturbance elimination performance and is expressed as in an equation (a) of TABLE 8.

In addition, in FIG. 3, the model matching compensator determines the response characteristic on input and output by means of a normal model $R_2(S)$ in a feedforward section and determines the external disturbance elimination performance and a stability by means of a normal model $R_1(S)$ in a feedback section.

For example, the model matching compensator is constituted by two first-order lag low-pass filters as expressed in equations (b) and (c) of TABLE 8.

In these equations of (a), (b), and (c) of TABLE 8, τc, T1, and T2 denotes time constants.

The linear approximation model Gv(S) of the vehicle which is the controlled object gives an integration characteristic as expressed in an equation (d) of TABLE 8.

From the above description, the target driving/braking force For-hat (Forô) can be derived as expressed in equations (e) and (f) of TABLE 9.

In the equations (d), (e), and (f), M denotes a constant.

Figure 4:
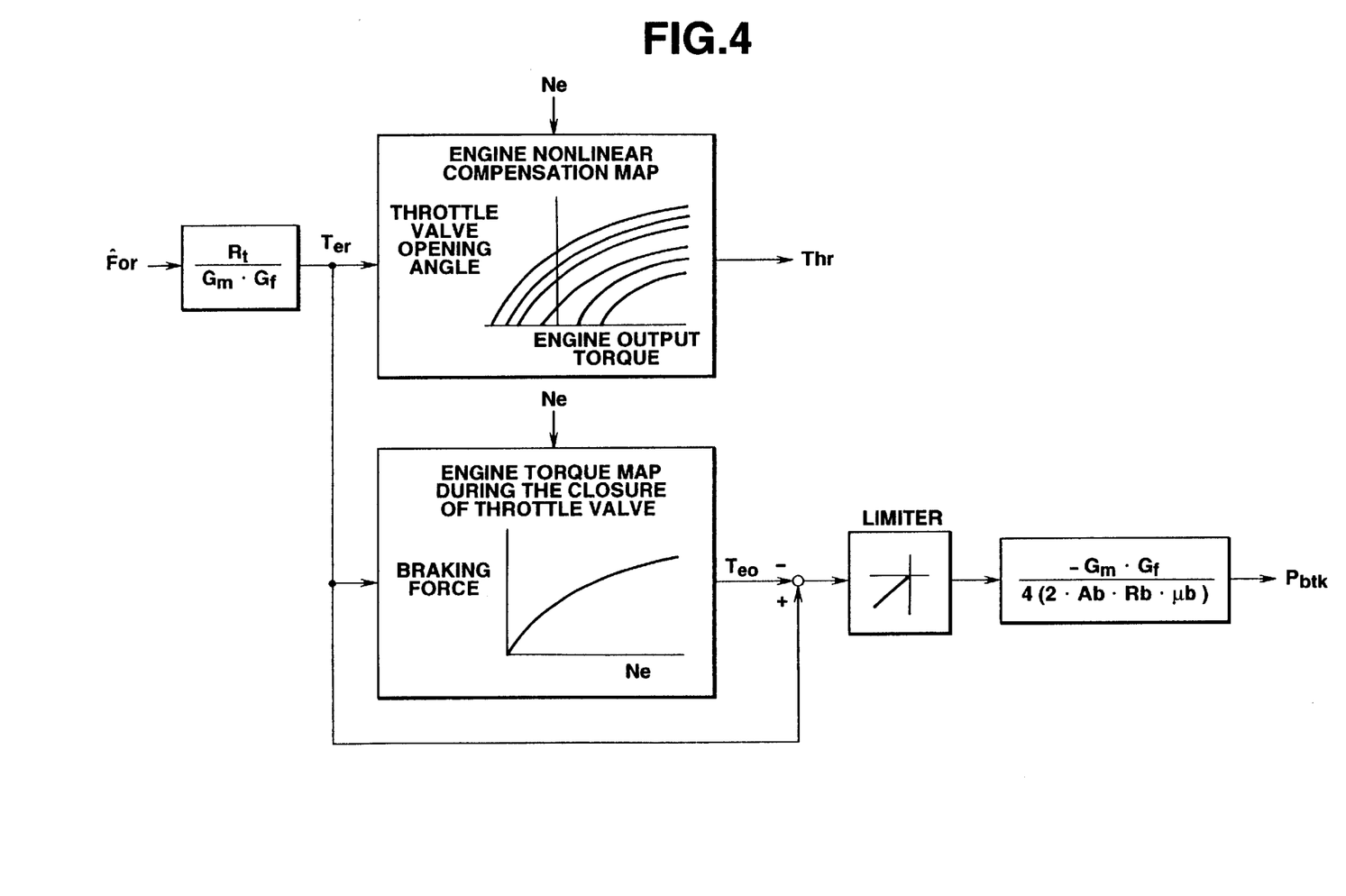
FIG. 4 is an explanatory view of calculation methods carried out in a throttle position calculating block and a brake pressure servo calculating block in the vehicular velocity servo controlling block shown in FIG. 3.

Methods of calculating the throttle angular position (opening angle) command value Thr and calculating the braking pressure command value Pbrk in the driving force distributing block 512 are achieved by a structure shown in FIG. 4.

First, a torque command value Ter is derived by transforming the target driving/braking force Forô thereinto using an equation (g) of TABLE 9.

In the equation (g) of TABLE 9, Rt denotes an effective radius of each road wheel of the vehicle to be controlled, Gm denotes a gear ratio of the automatic transmission 4 of the vehicle, and Gf denotes a final gear ratio.

In the throttle position control, the command value on the throttle valve angular position is derived from the torque command value Ter and an engine speed Ne using a non-linear compensation map shown in FIG. 4 on the throttle valve opening angle with respect to a previously stored engine output torque shown in FIG. 4. Then, the throttle position servo calculating block 513 drivingly controls the throttle valve actuator 3 using a drive current which corresponds to a deviation between the target throttle angular position and the present throttle angular position.

On the other hand, in the case of the brake control to decelerate the vehicle, the braking liquid pressure command value Pbrk is supplied to the brake pressure servo calculating block 514 when the throttle valve position angle command value indicates zero, i.e., when the throttle valve is fully closed.

The brake controlling block 514 drivingly controls the brake system 6 through a brake pressure actuator 6 in the brake system using a drive current.

The braking liquid pressure command value Pbrk is calculated by deriving a torque Te0 when the throttle valve is completely closed from a map shown in FIG. 4 of a previously stored engine output torque during the completely closure of the throttle valve with respect to the engine speed Ne and subtracting the torque Te0 from the calculated torque value Ter when the throttle valve opening angle (angular position) command value is zeroed.

That is to say, the braking liquid pressure command value Pbrk is derived as given by an equation (h) of TABLE 9.

In the equation (h) of TABLE 9, Ab denotes an area of each wheel cylinder of the vehicle, Rb denotes an effective radius of each braking disc of the vehicle, and $\mu b$ denotes a friction coefficient of a braking disc pad of each wheel of the vehicle.

It is noted that, although not shown in FIGS. 3 and 4, the transmission gear ratio controlling block may be installed which issues a down-shift command or an up-shift command to the automatic transmission A/T 4 according to the throttle valve opening angle and the vehicular velocity V.

In the preceding vehicle follow-up control, the vehicular velocity is automatically adjusted to maintain the inter-vehicle distance constant when the velocity of the preceding vehicle is varied during the follow-up run of the vehicle.

Hence, if the preceding vehicle to be followed by the vehicle is decelerated and the vehicular velocity becomes lowered crossing the lower limit velocity $V_L$ (for example, 40 Km/h), the preceding vehicle follow-up control is released.

Particularly, in a case where the vehicle is decelerated during the application of the brake, the brake which has up to now been applied to the vehicle is also released so that the above-described sudden G drop and a feeling of the jolt is given by the vehicular occupant(s).

Hence, in the preferred embodiment, in the case where the vehicular velocity becomes lowered crossing the set lower limit vehicular velocity $V_L$ during the application of the brake to follow the decelerated preceding vehicle, the brake control for the vehicular brake system 6 is still continued in such a manner that the present deceleration is maintained.

In details, in a case where the vehicular velocity becomes decreased and has crossed the set lower limit vehicular velocity $(V_L)$ due to the application from the preceding vehicle follow-up controlling block 50, only the brake control through the brake pressure servo calculating block 514 is continued and all of the controls of the control system shown in FIG. 2 are released. In addition, the controller 5 informs the vehicular occupant that only the brake control is continued within the controller 5.

When only the brake operation is continued through the brake pressure servo calculating block 514 and either a brake pedal operation (depression) or an accelerator pedal acceleration (depression) operation is performed so that a vehicular driver's driving intention is confirmed, the controller 5 determines that the vehicular driver's own driving operation has hereinafter been carried out in his responsibility of the vehicular driver and releases its own follow-up control to be nullified (all of the preceding vehicle follow-up control items including the brake control).

Consequently, no such a phenomenon as the above-described G drop or as the feeling of jolt can be avoided and an appropriate inter-vehicle distance can be maintained.

Figure 5:
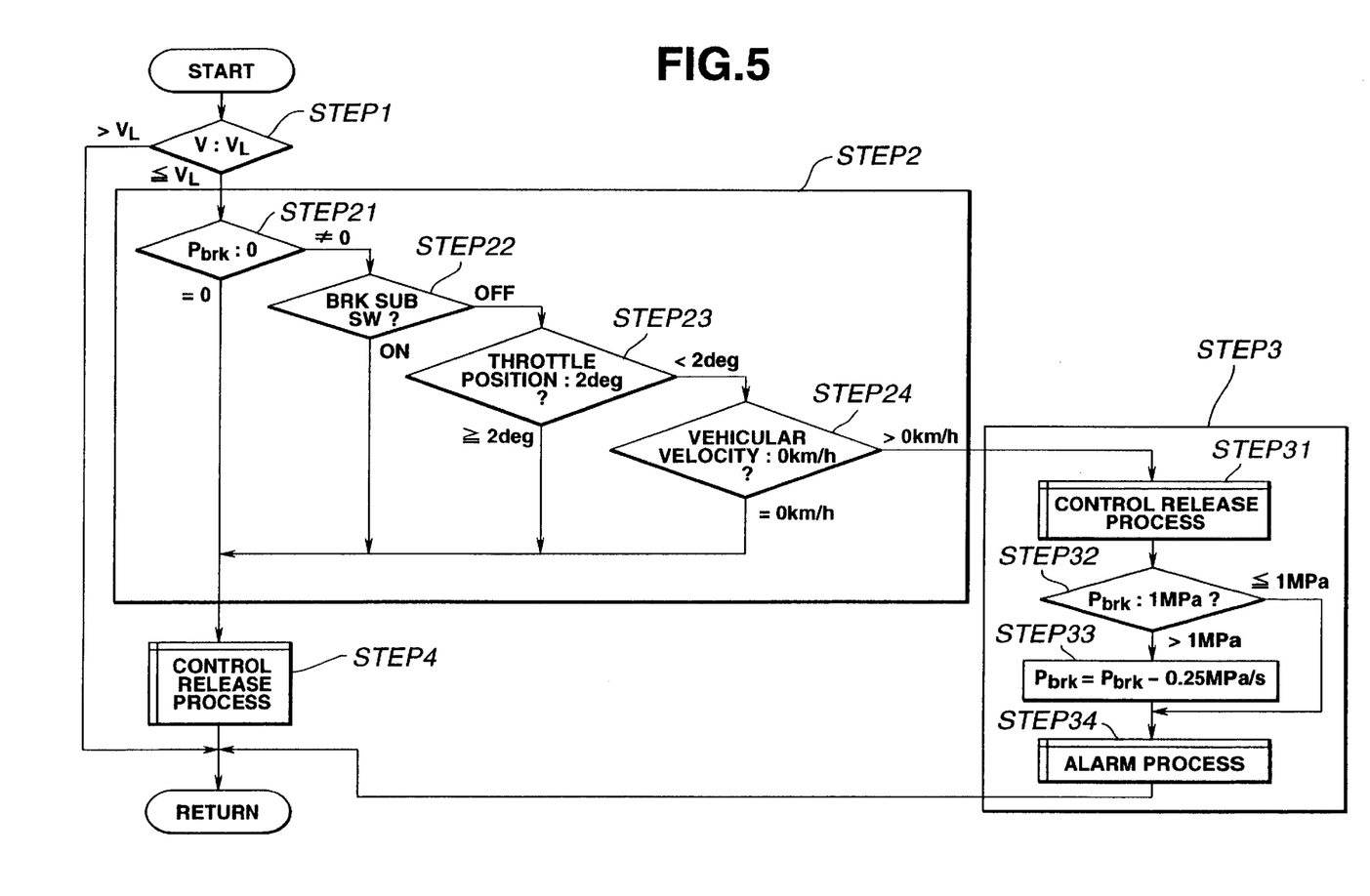
FIG. 5 is an operational flowchart indicating a release process routine of a preceding vehicle follow-up control operation in the preferred embodiment shown in FIG. 1A.

FIG. 5 shows a release processing routine on the preceding vehicle follow-up control in the preferred embodiment according to the present invention.

At a step STEP 1, the CPU 5b of the controller 5 determines whether the present vehicular velocity falls within an allowance range of the vehicular velocity to execute the preceding vehicle follow-up control.

If the vehicular velocity V is greater than the lower limit value $(V_L)$ at the step STEP 1, the release processing shown in FIG. 5 is ended to continue the preceding vehicle follow-up control. If the vehicular velocity V is lower than the set lower limit velocity $V_L$, the routine goes to a step STEP 2.

At the step STEP 2, conditions to release the preceding vehicle follow-up control, namely, conditions for the preceding vehicle follow-up control to be released such as a presence or absence of the brake operation through the controller 5 (the vehicular velocity servo controlling block 514), the presence or absence of the brake operation or the accelerator pedal depression through the vehicular occupant, the state of the vehicular stop are determined.

In more details, at a step STEP 21, the CPU 5b of the controller 5 determines whether a cause for the vehicular velocity to be decreased and fall below the set lower limit velocity $V_L$ lies in the brake operation.

At a step STEP 22, the CPU 5b of the controller 5 determines whether the vehicular deceleration only due to the engine braking has been carried out.

If the brake liquid pressure command value Pbrk is zeroed, the deceleration has been carried out only due to an engine braking may be considered. Then, the routine goes to a step STEP 4 determining that no problem occurs even if all preceding vehicle follow-up controls are released. The release processing of the preceding vehicle follow-up control is carried out.

At a step STEP 22, the CPU 5b of the controller 5 confirms whether the cause for the vehicular velocity to be decreased and to cross the set lower limit value $V_L$ lies in the brake operation by the vehicular occupant.

In this embodiment, a brake sub-switch is installed, as apart from a normal brake switch (a stop lamp switch), which can determine whether the vehicular occupant has depressed on the brake pedal during the braking operation of the follow-up preceding vehicle.

At a step STEP 23, the CPU of the controller 5 determines whether the cause such that the vehicular velocity V becomes reduced and crossed the lower limit value lies in the accelerator pedal depression by the vehicular occupant. During the brake operation according to the preceding vehicle follow-up control, the opening angle of the throttle valve gives zero.

On the contrary, when the throttle valve opening angle is opened through a predetermined value, for example, two degrees or wider, it may be considered that the accelerator pedal has been depressed by the vehicular occupant (driver).

When the accelerator operation has been carried out, it may be determined that the driving operation of the vehicle has hereinafter been carried out by the vehicular occupant and the routine goes to the step STEP 4 in which the release processing of the preceding vehicle follow-up control is executed.

At a step STEP 24, the CPU 5b of the controller 5 confirms whether the vehicular velocity V is substantially zeroed. If the vehicular velocity V is substantially zero (V=0) at the step STEP 4, the routine goes to the step STEP 4 to execute the release processing.

If all of the conditions to release the preceding vehicle follow-up control described above are not satisfied, the routine of FIG. 5 goes to a step STEP 3.

Figure 6:
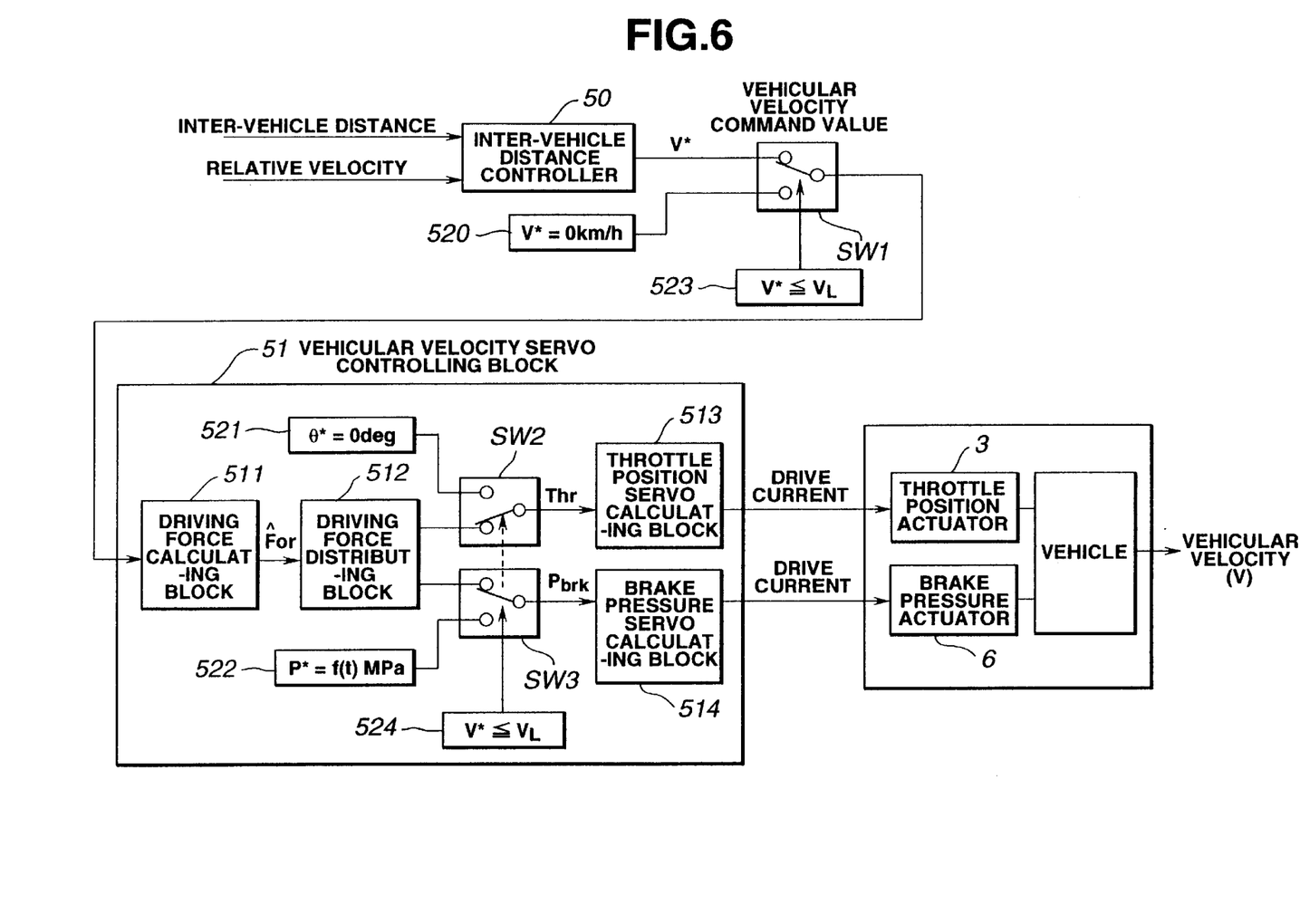
FIG. 6 is a more detailed functional block diagram of the vehicular velocity servo controlling block of the controller shown in FIG. 2.

At the step STEP 3, only the brake control is continued through a switch SW3, a function generator 522, and the brake pressure servo calculating block 514, and the brake system 6 as shown in FIG. 6 but the other follow-up control is released.

In details, at a step STEP 31, the releasing of all of the preceding vehicle follow-up control except the series of the braking system components described above is carried out.

It is noted that once this control logic of STEP 3 is entered, the vehicle will not fall into the preceding vehicle follow-up control even if the preceding vehicle is accelerated.

At a step STEP 32, the CPU 5b of the controller 5 confirms the liquid pressure command value when the vehicular velocity V is reduced crossing the lower limit value $L_T$ of the preceding vehicle follow-up control.

If the braking liquid pressure command value is greater than a predetermined braking liquid pressure, for example, 1 Mpa (Mega-pascal), the pressure at that time is held (command value of the braking liquid pressure) and is controlled so as to become gradually reduced at a gradient (for example, −0.25 Mpa/s (s: seconds) up to the predetermined pressure value of 1 Mpa.

If the braking liquid pressure command value Pbrk is less than the predetermined pressure of 1 Mpa, the pressure command value is outputted to hold its pressure value without passing the step STEP 33.

At the step STEP 33, the braking liquid pressure command value Pbrk is decremented with respect to time by a predetermined gradient, for example, −0.25 Mpa/s as follows: Pbrk=Pbrk−0.25 Mpa/s.

Thus, the final braking liquid pressure command value Pbrk indicates 1 Mpa.

At the next step STEP 34, the CPU of the controller 5 informs the vehicular occupant of only the braking control through the brake system 6 being carried out from-among the preceding vehicle follow-up control operations.

A method of informing the vehicular occupant(s) of the above-described matter carried out in response to the alarm process of the step STEP 34 is, for example, to produce a continuous buzzer sound through an alarm unit having a buzzer in order to have the vehicular occupant an immediate appropriate driving operation.

When the vehicular velocity V becomes reduced and has crossed the lower limit velocity $V_L$ during the follow-up control using the application of the brake for the vehicle to follow up the preceding vehicle which is decelerated, only the braking control through the function generator 522, the switch SW3, the brake pressure servo calculating block 514, the brake system 3 (including the brake pressure actuator) is continued to maintain the vehicular deceleration.

Hence, the vehicular occupant(s) does not give the unpleasant feeling due to the sudden G drop and the jolting and the appropriate inter-vehicle distance to the preceding vehicle can be maintained thereafter.

It is noted that FIG. 6 shows the more detailed functional block diagram of the automatic vehicular velocity controlling apparatus for the automotive vehicle in the preferred embodiment.

That is to say, when the target vehicular velocity (viz., the calculated vehicular velocity command value) V* becomes reduced and has crossed the lower limit value ($V_L$) of the vehicular velocity above which the preceding vehicle follow-up control becomes effective (V*≦$V_L$), this result (V*≦$V_L$, 523) of the vehicular velocity comparison drives a switch SW1 to be switched to a first constant generator 520 (V*=0 km/h) so that the vehicular velocity servo controlling block 51 receives the output of the first constant generator 520 as V*=0 (km/h).

At the same time when V*≦$V_L$ 524, switches SW2 and SW3 are driven to be switched to a second constant generator 521 (θ*=0 (degrees), viz., the target opening angle θ * (θ*=Thr) of the engine throttle valve 3 is zeroed to completely close the throttle valve 3) and to the function generator 522 (P*=f(t)MPa, viz., the target braking liquid pressure P* (the braking liquid pressure command value) is dependent on the value of the braking liquid pressure when the target value of the vehicular velocity becomes reduced and has crossed the set lower limit value (V* (≈V)≦$V_L$).

Hence, the throttle position servo calculating block 513 receives the throttle angular position command indicating zero value from the function generator 521 via the switch SW2 in place of the output of the driving force distributing block 512. The brake pressure servo calculating block 514 receives the target braking liquid pressure P* (P*=f(t)MPa) from the function generator 522 through the switch SW3 in place of the output of the driving force distributing block 512. In addition, the target vehicular velocity V*, viz., the vehicular velocity command value from the inter-vehicle distance controller 50 outputs zeroed vehicular velocity command value to the vehicular velocity servo controlling block 51.

This series of operations described above can explain the term of control release used in the specification.

Figure 7A:
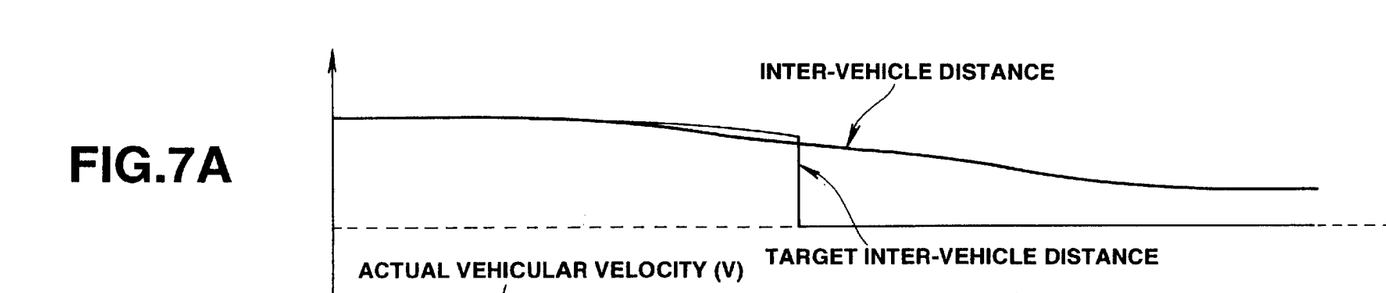
FIGS. 7A, 7B, and 7C are timing charts for explaining changes in a target inter-vehicle distance, in a vehicular velocity, and in a brake liquid pressure, when the vehicular velocity (V) is decreased and has crossed a lower set vehicular velocity limit value ($V_L$) in the preferred embodiment shown in FIG. 1A.
Figure 7B:
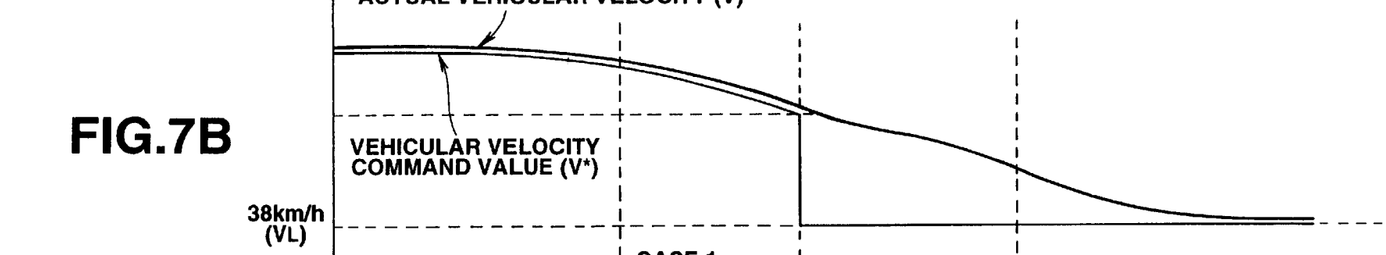
Figure 7C:
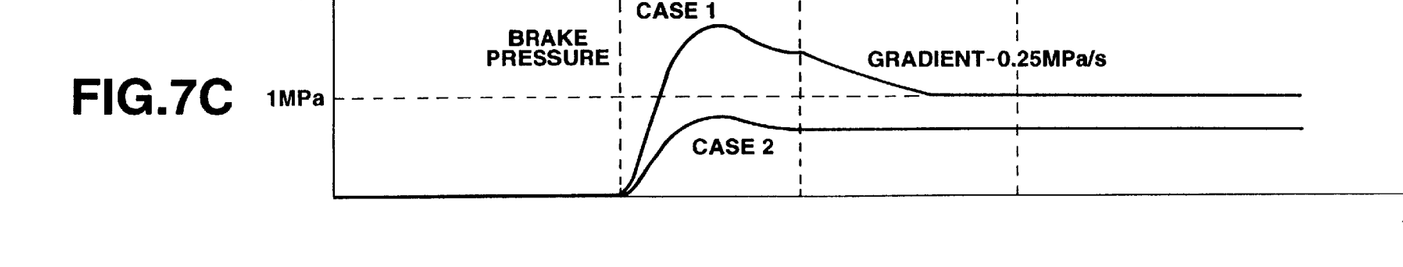

It is also noted that FIGS. 7A, 7B, and 7C show integrally a timing chart for explaining movements of the detected value of the inter-vehicle distance $L_T$, the target inter-vehicle distance $L_T$*, the detected value of (actual) vehicular velocity (V), the vehicular velocity command value (V*), and the brake pressure (braking liquid pressure).

In FIG. 7C, CASE 1 denotes a case wherein when the vehicular velocity becomes reduced and has crossed the lower limit value of the velocity $V_L$ (in this case, 38 Km/h), the braking liquid pressure is gradually decreased from the value of the braking liquid pressure when V* (≈V)≦$V_L$ (38 Km/h) up to 1 MPa at the gradient of −0.25 MPa/S and the braking liquid pressure is maintained at 1 MPa and CASE 2 denotes another case wherein when V* (≈V)≦$V_L$ (38 Km/h) and the braking liquid pressure is less than 1 MPa (Pbrk<1 Mpa), the braking liquid pressure at that time is maintained after V* (≈V)≦$V_L$.

It is noted that a comparator corresponds to the step STEP 1 in FIG. 5.

It is also noted that a vehicular driving operation detector includes a manual driving operation information sensor having the brake sub-switch and accelerator pedal switch to detect whether the depression of the accelerator pedal is present or not.

The entire contents of a Japanese Patent Application P10-146048 (filed May 27, 1998) are herein incorporated by reference.

Although the invention has been described above by reference to the certain embodiment of the present invention, the present invention is not limited to the embodiment described above will occur to those skilled in the art, in light of the above teachings.

The scope of the invention is defined with reference to the following claims.

TABLE 1

$$V_S = \frac{1}{1 + \tau_v S} V^* \quad (5)$$

TABLE 2

$$\dot{x}_1 = -\frac{1}{\tau_v} x_1 + \frac{1}{\tau_v} \Delta V^* \quad (6)$$

TABLE 3

$$x_2 = -(V_T - V_S) = -x_1 \quad \ldots (7)$$

TABLE 4

$$\frac{d}{dt}\begin{bmatrix} \dot{x}_1 \\ \dot{x}_2 \end{bmatrix} = \begin{bmatrix} -1/\tau_v & 0 \\ -1/\tau_v & 0 \end{bmatrix}\begin{bmatrix} x_1 \\ x_2 \end{bmatrix} + \begin{bmatrix} -1/\tau_v \\ 0 \end{bmatrix}\Delta V^* \quad (8)$$

TABLE 5

$$u = FX, \quad F = [fv \; fd] \quad (9)$$

$$\dot{X} = (A + BF)X \quad (10)$$

$$A' = (A + BF) = \begin{bmatrix} (fv-1)/\tau_v & fd/\tau_v \\ -1 & 0 \end{bmatrix} \quad (11)$$

$$|sI - A'| = s^2 + \frac{(1-fv)}{\tau_v} s + \frac{fd}{\tau_v} = 0 \quad (12)$$

$$s^2 + \frac{(1-fv)}{\tau_v} s + \frac{fd}{\tau_v} = s^2 + 2\zeta\omega_n s + \omega_n^2 = 0 \quad (13)$$

TABLE 6

$$fv = 1 - 2\zeta\omega_n \cdot \tau_v \quad \ldots (14)$$
$$fd = \omega_n^2 \cdot \tau_v \quad \ldots (15)$$

TABLE 7

$$V^* = V_T - \Delta V^* \quad \ldots (16)$$
$$= (1 - fv)\Delta V + fd(L_T^* - L_T) + V_S, \text{ wherein}$$
$$V_T = V_S + \Delta V \quad \ldots (17)$$

TABLE 8

$$H(s) = (1 + \tau_c \cdot S)^{-1} \quad \ldots (a)$$
$$R_1(s) = (1 + T_1 \cdot S)^{-1} \quad \ldots (b)$$
$$R_2(s) = (1 + T_2 \cdot S)^{-1} \quad \ldots (c)$$
$$G_v(s) = (M \cdot S)^{-1} \quad \ldots (d)$$

TABLE 9

$$\hat{F}_{or}(s) = \frac{R_1(s)}{G_V(s)(1 - R_1(s))}\left[\frac{R_2(s)}{R_1(s)} V^* - V\right] \quad (e)$$
$$= \frac{M}{T_1}\left[\frac{1 + T_1 \cdot S}{1 + T_2 \cdot S} V^* - V\right]$$

$$\hat{F}_{or}(s) = \frac{1}{1 - H(s)}\left[F_{or}(s) - \frac{H(s)}{G_V(s)} \cdot V\right] \quad (f)$$
$$= \frac{1 + \tau_C \cdot S}{\tau_C \cdot S} \cdot F_{or}(s) - \frac{M}{\tau_C} \cdot V$$

$$T_{cr} = \frac{R_t}{G_m \cdot G_f} \cdot \hat{F}_{or} \quad (g)$$

$$P_{brk} = \frac{-G_m \cdot G_f}{4(2 \cdot Ab \cdot Rb \cdot \mu b)}(T_{cr} - T_{c0}) \quad (h)$$

What is claimed is:

1. A vehicular velocity controlling apparatus for an automotive vehicle, comprising:

an inter-vehicle distance detector detecting an inter-vehicle distance from the vehicle to another vehicle which is running ahead of the vehicle;

a vehicle velocity detector detecting a vehicular velocity of the vehicle;

an inter-vehicle distance controller, the inter-vehicle distance controller calculating a target value of the vehicular velocity, the target value of the vehicular velocity being calculated to make the detected value of the inter-vehicle distance equal to a target value of the inter-vehicle distance;

a vehicular velocity servo controller, the vehicular velocity servo controller being responsive to the target value of the vehicular velocity from the inter-vehicle distance controller, calculating a target value of a vehicular force to be exerted by the vehicle to vary the vehicular velocity according to the target value of the vehicular velocity, and distributing the target value of the vehicular force exerted by the vehicle into a vehicular driving force for a vehicular drive system and a vehicular braking force for a vehicular brake system;

a comparator, the comparator comparing the detected value of the vehicular velocity with a set lower limit value of the vehicular velocity in a vehicular velocity controllable range;

a control release command generator, the control release command generator being responsive to a result of a comparison by the comparator indicating that the detected value of the vehicular velocity, which is made equal to the target value of the vehicular velocity according to the result of vehicular force by means of the vehicular servo controller, is lower than the set lower limit value and generating and outputting a release command to release a calculation of the target value of the vehicular velocity by the inter-vehicle distance controller and to release the calculation of the target value of the vehicular force by the vehicular velocity servo controller; and a function generator, the function generator being responsive to the result of the comparison by the comparator and generating and outputting a predetermined function to the vehicular brake system to only continue a control of the vehicular braking force through the vehicular brake system.

2. A vehicular velocity controlling apparatus for an automotive vehicle as claimed in claim 1, wherein, the comparator is responsive to a preceding vehicle follow-up control for the vehicle to follow up the another vehicle at the target value of the inter-vehicle distance through the vehicular brake system.

3. A vehicular velocity controlling apparatus for an automotive vehicle as claimed in claim 1, wherein, when the result of the comparison by the comparator indicates that the target value of the vehicular velocity which is made equal to the detected value thereof becomes reduced and has crossed the set lower limit value $V_L$ of the vehicular velocity, the control release comm and generator and the function generator respond.

4. A vehicular velocity controlling apparatus for an automotive vehicle as claimed in claim 1, wherein the control release command generator includes: a first constant generator, the first constant generator being responsive to the result of the comparison by the comparator and generating and outputting the target value of the vehicular velocity indicating zero to the vehicular velocity servo controller; and a second constant generator, the second constant generator being responsive to the result of the comparison by the comparator and generating and outputting the target value of the vehicular force indicating zero to an actuator of the vehicular velocity servo controller connected to the vehicular drive system.

5. A vehicular velocity controlling apparatus for an automotive vehicle, comprising:
   an inter-vehicle distance detector detecting an inter-vehicle distance from the vehicle to another vehicle which is running ahead of the vehicle;
   a vehicle velocity detector detecting a vehicular velocity of the vehicle;
   an inter-vehicle distance controller, the inter-vehicle distance controller calculating a target value of the vehicular velocity, the target value of the vehicular velocity being calculated to make the detected value of the inter-vehicle distance equal to a target value of the inter-vehicle distance;
   a vehicular velocity servo controller, the vehicular velocity servo controller being responsive to the target value of the vehicular velocity from the inter-vehicle distance controller, calculating a target value of a vehicular force to be exerted by the vehicle to vary the vehicular velocity according to the target value of the vehicular velocity, and distributing the target value of the vehicular force exerted by the vehicle into a vehicular driving force for a vehicular drive system and a vehicular braking force for a vehicular brake system;
   a comparator, the comparator comparing the detected value of the vehicular velocity with a set lower limit value of the vehicular velocity in a vehicular velocity controllable range;
   a control release command generator, the control release command generator being responsive to a result of a comparison by the comparator and generating and outputting a release command to release a calculation of the target value of the vehicular velocity by the inter-vehicle distance controller and to release the calculation of the target value of the vehicular force by the vehicular velocity servo controller; and a function generator, the function generator being responsive to the result of the comparison by the comparator and generating and outputting a predetermined function to the vehicular brake system to only continue a control of the vehicular braking force through the vehicular brake system; wherein
   the function generator includes:
      a determinator determining whether a target value of a braking liquid pressure, at a time point when the result of the comparison by the comparator indicates that the vehicular velocity becomes reduce and has crossed the set lower limit value $V_L$ of the vehicular velocity, is greater than a predetermined braking liquid value; and
      a braking liquid pressure command generator, the braking liquid pressure command generator being responsive to the result of the determination by the determinator and generating and outputting the target value of the braking liquid pressure as a braking liquid pressure command value Pbrk to a braking pressure servo calculating block of the vehicular velocity servo controller, the target value of the braking liquid pressure being the predetermined function dependent upon the result of the determination by the determinator.

6. A vehicular velocity controlling apparatus for an automotive vehicle as claimed in claim 5, wherein when the determinator determines that the target value of the braking liquid pressure is greater than the predetermined braking liquid pressure value, the braking liquid pressure command generator generates and outputs the target value of the braking liquid pressure at the time point when the result of the comparison by the comparator indicates that the vehicular velocity becomes reduced and has crossed the set lower limit value $V_L$ of the vehicular velocity to the braking pressure servo calculating block and reduces the target value of the braking liquid pressure by a predetermined gradient to be approached to the predetermined braking liquid pressure value.

7. A vehicular velocity controlling apparatus for an automotive vehicle as claimed in claim 5, wherein, when the target value of the braking liquid pressure at the time point when the result of the comparison by the comparator indicates that the vehicular velocity is not greater than the predetermined braking liquid pressure, the braking liquid pressure command generator generates and outputs the target value of the braking liquid pressure to the braking liquid pressure servo calculating block to maintain the braking liquid pressure of the vehicular brake system at the time point when the result of the comparison by the comparator indicates that the vehicular velocity becomes reduced and has crossed the set lower limit value $V_L$ of the vehicular velocity.

8. A vehicular velocity controlling apparatus for an automotive vehicle as claimed in claim 6, wherein the predetermined gradient is approximately –0.25 MPa/S, wherein S denotes second.

9. A vehicular velocity controlling apparatus for an automotive vehicle as claimed in claim 6, wherein the predetermined braking liquid pressure value is approximately 1 MPa.

10. A vehicular velocity controlling apparatus for an automotive vehicle as claimed in claim 7, further comprising: a driving operation detector detecting a driving operation of the vehicle by a vehicular occupant; and another control release command generator, the other control release command generator being responsive to a result of a detection by the driving operation detector and generating and outputting another control release command to the function generator to halt the output of the target value of the braking liquid pressure by the braking liquid pressure command generator of the function generator.

11. A vehicular velocity controlling apparatus for an automotive vehicle as claimed in claim 1, further comprising an alarm unit, the alarm unit being responsive to an activation of the function generator and producing an alarm to inform a vehicular occupant of a continuation of the braking force control by the function generator through the vehicular brake system.

12. A vehicular velocity controlling apparatus for an automotive vehicle as claimed in claim 4, wherein the vehicular drive system includes a throttle valve of a vehicular engine, the actuator comprises an electric motor, and the second constant generator generates and outputs a target value of an opening angle of the throttle valve indicating zero ($\theta^*=0$) to the actuator to release the control of the opening angle of the throttle valve.

13. A vehicular velocity controlling method for an automotive vehicle, comprising:

detecting an inter-vehicle distance from the vehicle to another vehicle which is running ahead of the vehicle;

detecting a vehicular velocity of the vehicle;

calculating a target value of the vehicular velocity, the target value of the vehicular velocity being calculated to make the detected value of the inter-vehicle distance equal to a target value of the inter-vehicle distance;

calculating a target value of a vehicular force to be exerted by the vehicle to vary the vehicular velocity according to the target value of the vehicular velocity;

distributing the target value of the vehicular force exerted by the vehicle into a vehicular driving force for a vehicular drive system and a vehicular braking force for a vehicular brake system;

comparing the detected value of the vehicular velocity with a set lower limit value of the vehicular velocity in a vehicular velocity controllable range;

outputting a release command to release a calculation of the target value of the vehicular velocity and to release the calculation of the target value of the vehicular force in response to a result of the comparing indicating that the detected value of the vehicular velocity, which is made equal to the target value of the vehicular velocity as a result of the distributing the target value of the vehicular force exerted by the vehicle, is lower than the set lower limit value; and outputting a predetermined function to the vehicular brake system to only continue a control of the vehicular braking force through the vehicular brake system.

* * * * *